United States Patent
Desplanques et al.

(10) Patent No.: US 8,590,015 B2
(45) Date of Patent: Nov. 19, 2013

(54) METHOD AND DEVICE TO SUSPEND THE ACCESS TO A SERVICE

(75) Inventors: Bart Desplanques, Merelbeke (BE); Stan Claes, Heffen (BE)

(73) Assignee: Thomson Licensing, Boulogne-Billancourt (FR)

( * ) Notice: Subject to any disclaimer, the term of this patent is extended or adjusted under 35 U.S.C. 154(b) by 643 days.

(21) Appl. No.: 11/992,154

(22) PCT Filed: Jun. 27, 2006

(86) PCT No.: PCT/EP2006/063600
§ 371 (c)(1),
(2), (4) Date: Mar. 17, 2008

(87) PCT Pub. No.: WO2007/039329
PCT Pub. Date: Apr. 12, 2007

(65) Prior Publication Data
US 2009/0271846 A1 Oct. 29, 2009

(30) Foreign Application Priority Data
Sep. 21, 2005 (EP) .................... 05447215

(51) Int. Cl.
*H04L 29/06* (2006.01)
(52) U.S. Cl.
USPC ............ 726/4; 380/270; 713/182; 726/28
(58) Field of Classification Search
USPC ........ 380/270; 713/182; 726/4, 28; 709/229; 455/41, 41.1, 41.2
See application file for complete search history.

(56) References Cited

U.S. PATENT DOCUMENTS

| | | | |
|---|---|---|---|
| 6,600,902 B1 * | 7/2003 | Bell | 455/41.2 |
| 6,618,584 B1 | 9/2003 | Carneheim et al. | |
| 6,775,782 B1 | 8/2004 | Buros et al. | |
| 6,795,688 B1 * | 9/2004 | Plasson et al. | 455/41.2 |

(Continued)

FOREIGN PATENT DOCUMENTS

| | | | |
|---|---|---|---|
| EP | 1263174 | | 12/2002 |
| EP | 1416686 A1 * | | 5/2004 |
| JP | 2002353976 | | 6/2002 |
| JP | 2002-353976 | | 12/2002 |

OTHER PUBLICATIONS

Ghosh, Om; Bandyopadhyay, Subhansu; Majumdar, Anirban; Chatterjee, Samidh; Chattopadhyay, Santanu; "A Proposal for Improvement in Service-Level Security Architecture of Bluetooth", Conference on Convergent Technologies for Asia-Pacific Region, Oct. 15-17, 2003, vol. 3, pp. 1058-1061.*

(Continued)

*Primary Examiner* — Victor Lesniewski
(74) *Attorney, Agent, or Firm* — Tutunjian & Bitetto, P.C.

(57) ABSTRACT

The present invention concerns a device and method for suspending and renewing the authorization to a wireless station to use a service on the device.

The device comprises wireless communication means, a memory and at least one service for access by at least one station also comprising wireless communication means, means for authenticating the wireless station, means for authorizing the authenticated station to access one of the at least one service.

The device comprises means for suspending the authorized station to access the service; and in response to a user request on the device, renewing the access authorization to the service by the suspended station, without requiring any user interaction on the station.

16 Claims, 4 Drawing Sheets

(56) References Cited

U.S. PATENT DOCUMENTS

| | | | | |
|---|---|---|---|---|
| 6,865,371 | B2* | 3/2005 | Salonidis et al. | 455/41.1 |
| 7,174,130 | B2* | 2/2007 | Kurisko et al. | 455/41.2 |
| 7,463,861 | B2* | 12/2008 | Eisenbach | 455/41.2 |
| 7,496,348 | B2* | 2/2009 | Srey et al. | 455/410 |
| 7,551,570 | B2* | 6/2009 | Nurminen et al. | 370/254 |
| 7,620,978 | B1* | 11/2009 | Reddy et al. | 726/8 |
| 7,627,767 | B2* | 12/2009 | Sherman et al. | 713/189 |
| 7,668,508 | B2* | 2/2010 | Zheng et al. | 455/41.2 |
| 7,689,169 | B2* | 3/2010 | Lee et al. | 455/41.2 |
| 7,787,863 | B2* | 8/2010 | van de Groenendaal | 455/411 |
| 7,809,812 | B2* | 10/2010 | Doumuki | 709/222 |
| 8,102,901 | B2* | 1/2012 | Aissi et al. | 375/219 |
| 8,219,496 | B2* | 7/2012 | Pearson et al. | 705/67 |
| 2002/0037736 | A1* | 3/2002 | Kawaguchi et al. | 455/518 |
| 2002/0183006 | A1 | 12/2002 | Yasushi et al. | |
| 2003/0036350 | A1* | 2/2003 | Jonsson et al. | 455/41 |
| 2003/0061606 | A1* | 3/2003 | Hartwig et al. | 725/25 |
| 2003/0134596 | A1* | 7/2003 | Zhu | 455/41 |
| 2004/0097193 | A1* | 5/2004 | Nakatsuka | 455/41.2 |
| 2004/0203354 | A1* | 10/2004 | Yue | 455/41.1 |
| 2004/0223482 | A1* | 11/2004 | Hong | 370/346 |
| 2005/0080883 | A1* | 4/2005 | Nurminen et al. | 709/221 |
| 2005/0197093 | A1* | 9/2005 | Wiklof et al. | 455/343.1 |
| 2005/0286478 | A1* | 12/2005 | Mela et al. | 370/338 |
| 2005/0289341 | A1* | 12/2005 | Ritola et al. | 713/168 |
| 2006/0047835 | A1* | 3/2006 | Greaux | 709/229 |
| 2006/0120301 | A1* | 6/2006 | Falck et al. | 370/254 |
| 2006/0250219 | A1* | 11/2006 | Hui | 340/10.1 |
| 2006/0258287 | A1* | 11/2006 | Bidet et al. | 455/41.2 |
| 2007/0037526 | A1* | 2/2007 | Estable | 455/74.1 |
| 2007/0197164 | A1* | 8/2007 | Sheynman et al. | 455/41.2 |

OTHER PUBLICATIONS

Nguyen, Lan; Safavi-Naini, Rei; Susilo, Willy; Wysocki, Tadeusz; "Secure Authorization, Access Control and Data Integrity in Bluetooth", 10$^{th}$ IEEE International Conference on Networks, 2002, pp. 428-433.*

Search Report Dated October 12, 2006.

* cited by examiner

Replacement Sheet showing changes

METHOD AND DEVICE TO SUSPEND THE ACCESS TO A SERVICE

BACKGROUND OF THE INVENTION

This application claims the benefit, under 35 U.S.C. §365 of International Application PCT/EP2006/063600, filed Jun. 27, 2006, which was published in accordance with PCT Article 21(2) on Apr. 12, 2007 in English and which claims the benefit of European patent application No. 05447215.4, filed on Sep. 21, 2005.

The present invention relates to a method and a device to suspend access to a service in particular in a wireless network environment.

The Bluetooth standard has been developed by the Bluetooth Special Interest Group. It defines several aspects of security, and among them, the authentication and the authorization procedures.

Authentication is a generic procedure between two devices for verifying the identity of one of the devices (the 'remote' device) by the other device.

If a link key already exists, the procedure consists in a challenge-response mechanism using a random number, a secret key, and the Bluetooth device address of the non-initiating device. The secret key can be the previously exchanged link key.

If a link key does not exist, the procedure comprises the pairing of devices. Pairing is a procedure that authenticates a pair of devices, based on a personal identification number, noted the PIN, and subsequently creates a common link key. The procedure consists in the creation of an initialization key, the creation and exchange of a common link key, which is an authentication key used for the pair only, and the challenge-response mechanism.

The Bluetooth specification also defines authorization. This is a procedure where a user of a Bluetooth device grants a specific remote Bluetooth device access to a specific service. Authorization implies that the identity of the remote device can be verified through the authentication procedure. The procedure may be based on user confirmation or on the existence of a trusted relationship.

The creation of a trusted relationship is a procedure where the remote device is marked as a trusted device. Trusting consists in the marking of a paired device as a trusted device. Trust marking can be done by the user or done by the device automatically after a successful pairing.

The document Bluetooth Security White Paper, version 1.00, 2004-04-19, published by the Bluetooth Special Interest Group defines a particular security architecture. The paper introduces authorization and trusted devices. Access to a Bluetooth service is only granted after an authorization procedure (for example by performing a given user interaction). After the authorization, the device becomes a trusted device and can access the services on the other device.

The Bluetooth security architecture does not allow the administrator to temporarily deny access to services to certain frequent users. For example, consider the case where a Bluetooth device is an access point, and the access point owner has a neighbor who frequently comes by and makes use of the Bluetooth services. The neighbor knows the PIN code to access the Bluetooth access point. The access point owner would have to change the PIN code all the time to ensure that the neighbor does not access the Bluetooth access point from next door.

SUMMARY OF THE INVENTION

The present invention concerns a method in a device to suspend the access to a service to stations and a device having the advantages of the invention. It applies in particular but not solely to the field of wireless networking.

To this end, the invention relates to a method for enabling a wireless station 2 to access at least one service owned by a device 1, comprising the following steps, at the device 1, of:
  authenticating the wireless station 2,
  authorizing the wireless station 2 that has been authenticated to access one of the at least one service,
  According to the invention, the method comprises the step of suspending the station 2 to access the service, keeping authentication information of the suspended station in a memory 3, and renewing the access authorization to the service by the suspended station.

Advantageously, the step of renewing the access authorization does not require a user confirmation on the suspended station. Then, a user does not have to enter a personal identification number on the suspended station to access the service.

According to an embodiment, the step of suspending includes the steps of rejecting an attempt from the suspended station to access the service.

According to an embodiment, the method further comprises the step of modifying the state of the station in the memory (3) for permitting among other the step of suspending or renewing.

According to an embodiment, the steps of suspending and renewing are performed through a user interface (7) by a user.

This permits the user to control the states of the station and among other, the steps of suspending and renewing.

According to an embodiment, the wireless network is a wireless personal area network. Preferably, the wireless personal area network conforms to the Bluetooth standard.

The invention also concerns a device 1 comprising wireless communication means 5, a memory 3 and at least one service for access by at least one station 2 also comprising wireless communication means 8, comprising:
  means for authenticating the wireless station (2), and
  means for authorizing the authenticated station to access one of the at least one service;
  According to the invention, the device comprises means for:
  suspending the authorized station to access the service;
  keeping authentication information of the suspended station in the memory 3; and
  renewing the access authorization to the service by the suspended station, without requiring any user interaction on the station.

According to an embodiment, the device comprises means for rejecting an attempt from the suspended station to access the service.

According to an embodiment, the memory 3 comprises means for modifying a state of the station.

According to an embodiment, the device further comprises a user interface for allowing a user to access the memory (3) and to administer the state of the station. Advantageously, the user interface comprises either a command line interface or a graphical user interface.

According to an embodiment, the wireless communication means 5 and 8 enable to connect to a wireless personal area network. Preferably, the wireless personal area network conforms to the Bluetooth standard.

BRIEF DESCRIPTION OF THE DRAWINGS

The invention will be better understood and illustrated by means of the following embodiment and execution examples, in no way restrictive, with reference to the appended figures among which.

The exemplary embodiment comes within the framework of a transmission on a Bluetooth wireless link, but the invention is not limited to this particular environment and may be applied within other wireless standards where an authentication process and an authorization process are used. More information concerning Bluetooth can be found in the Bluetooth standard Core Specification version 1.2, 5 Nov. 2003, and also in subsequent versions.

DETAILED DESCRIPTION OF PREFERRED EMBODIMENTS

Figure 1:
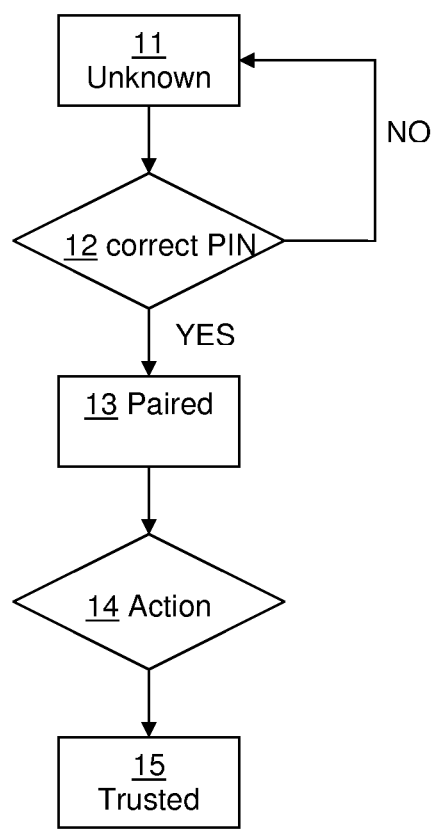
FIG. 1 is a flow diagram that illustrates the combined authentication and authorization mechanism as defined in the Bluetooth standard.

FIG. 1 illustrates the combined authentication and authorization mechanism as defined in the Bluetooth standard. It represents the different states that can be held by a station in the data base of the second station that is referred hereafter as a device.

A station authenticates with a device. The first step of the authentication is the link-key creation, through a PIN code exchange. If the PIN exchange 12 is successful, a link-key is created and the station and the device are paired 13. If the PIN exchange is not successful, the station remains in the 'unknown' state 11 for to the device; no information is stored in the device for that station. The second step of the authentication is a challenge-response mechanism.

The device then authorizes the station to access and use one of the services it owns. The device owns for example the "Network Access Point Service" or "Cordless Telephony Service". This is done for example through a user action on the device user interface 14. The station then becomes 'trusted' 15 as far as the device is concerned and it can use the service. The authorization requires a challenge-response mechanism implying a user confirmation on the station.

When the device cancels the authorization for a device to access a service, all authentication information is deleted from the device database. If the station wants to access a service again, it has to enter the PIN code.

Figure 2:
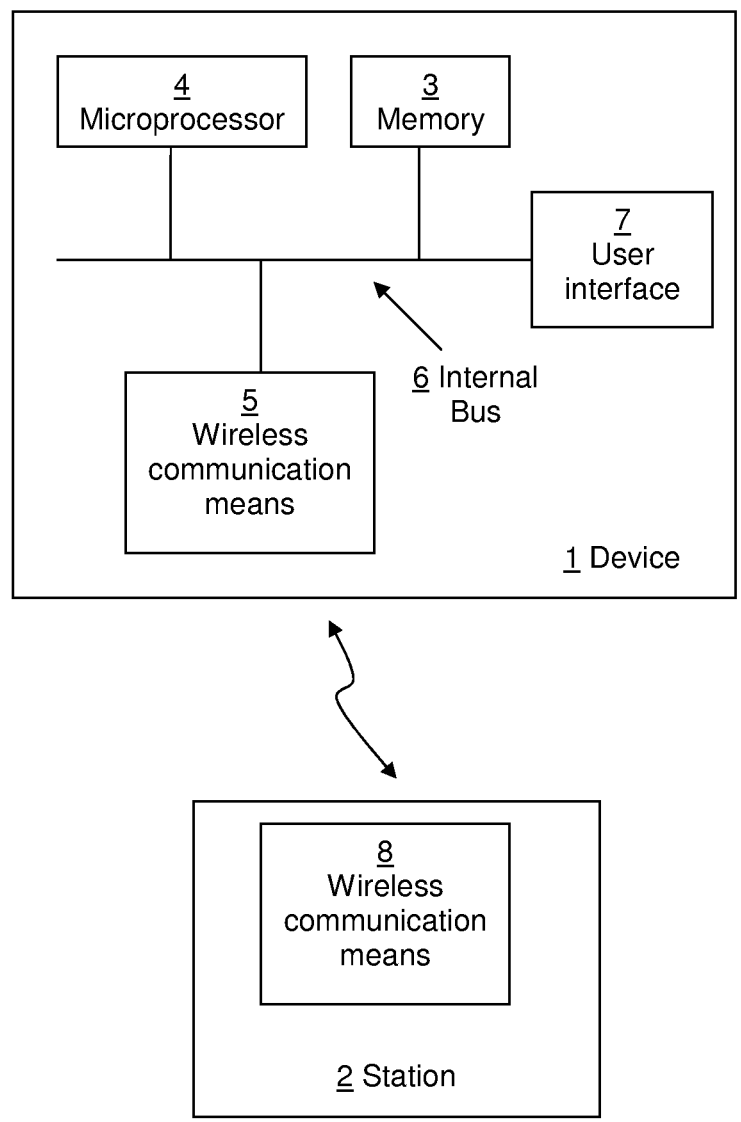
FIG. 2 is a schematic diagram showing the device compliant with the invention and a wireless station.

FIG. 2 represents a physical description of the device of the invention. The device 1 comprises a memory 3, which holds a data base comprising the identification of all the known stations and indicates the state of these stations. The device 1 comprises a microprocessor 4, wireless communication means 5 to dialog with a station 2 and a user interface 7 that permits a user to manage and control the device 1. User and control data are exchanged between modules through an internal bus 6.

Figure 3:
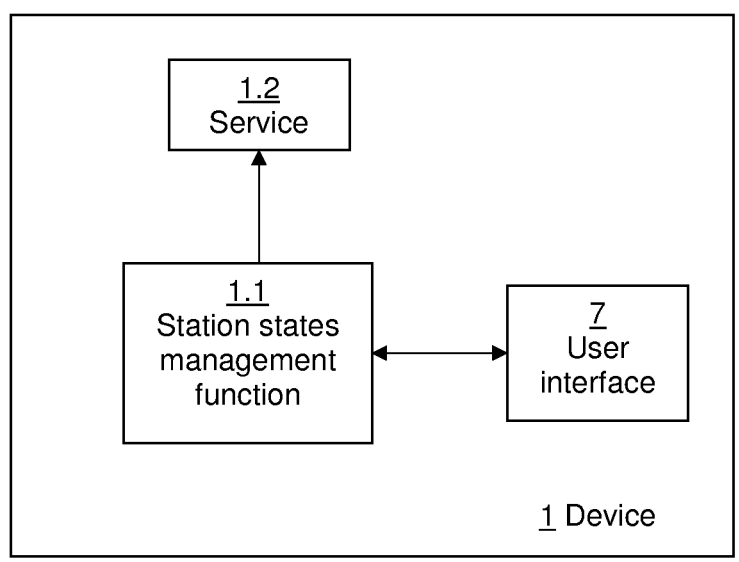
FIG. 3 is a schematic diagram showing some functions of the device.

As indicated on FIG. 3, the device 1 owns the services 1.2 that are accessed by the standard station 2. The user interface 7 permits the user to manage the states of the station 2; i.e. the user can diagnostic control and modify the states of the station. The station states management function 1.1 maintains the state of each wireless station 2, which are detailed in FIG. 4.

Figure 4:
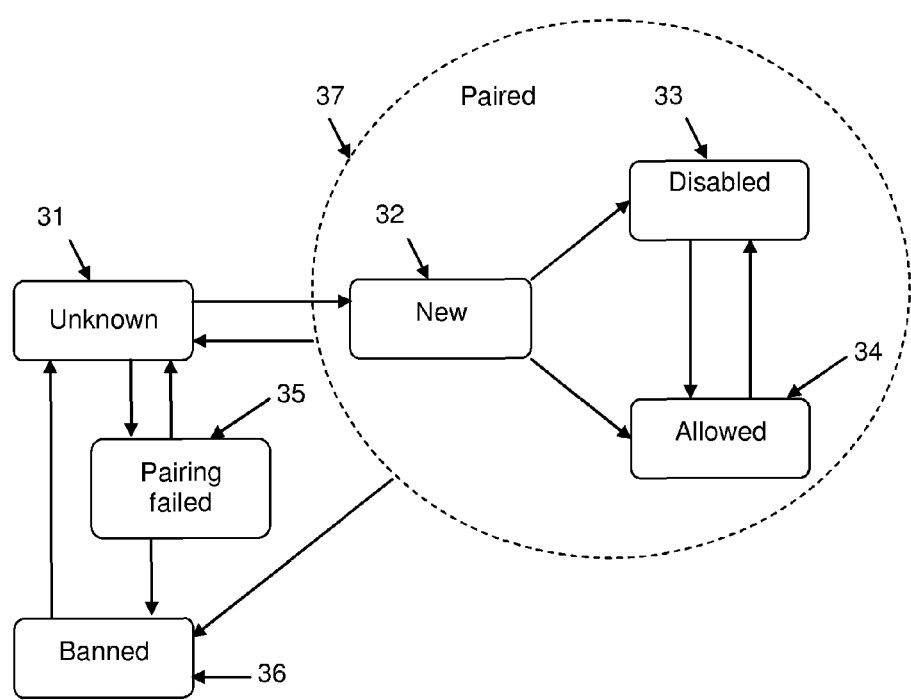
FIG. 4 is a flow diagram that illustrates the security architecture of the invention.

FIG. 4 indicates the different states that can be held by a station 2 in the data base of the device 1.

A station that is not present in the data base 3 of the device 1 is an 'unknown' 31 station. A station that is present in the data base, i.e. any station that is not 'unknown', is identified through its 48-bit Bluetooth address. It is then set to one of the following state: NEW 32, PAIRING FAILED 35, DISABLED 33, ALLOWED 34 and BANNED 36.

First, the station and the device authenticate as indicated in the Bluetooth standard. The station sends a PIN code to the device.

If the PIN code is not correct, the station is set to the PAIRING FAILED state. The station is identified by the device as having failed to authenticate. A PIN failure counter is created for this station. At each successive wrong PIN code, the device increments the counter for this station. When the counter reaches the maximum value, the 'banlimit' value, the station is automatically set to the BANNED state, where it can no longer authenticate. This means that further authentication tentative messages are ignored by the device for this station. The 'banlimit' value may be set to a default value, for example to three, or configurable by the user.

If the PIN code is correct, a link-key is created, the station is paired to the device and enters the NEW state. The PIN failure counter is reset. The station behaves then as a paired and untrusted station.

In each of the states NEW, ALLOWED and DISABLED, the station is paired to the device: it is authenticated by the device.

The device may set a station that is in the NEW state into the ALLOWED state. It then authorizes the station to use a service. Authorization implies that the identity of the remote device can be verified through the authentication procedure. The procedure may be based on user confirmation or on the existence of a trusted relationship. The behavior of the device towards the station is the same as for a paired and trusted standard Bluetooth station.

A station that is in the NEW or ALLOWED state can be set by the device into the DISABLED state. This is done by an action from the user on the device. The device has a user interface that allows the user to access the data base. The user selects the station and set the station to the DISABLED state. When a station is set to the DISABLED state, nothing is changed on the station itself. In the DISABLED state, the station cannot use any service of the device, but it remains paired to the device. The behavior of the device towards the station is the same as for a paired and untrusted standard Bluetooth station. The device rejects all the attempts from the station to access the services. The authentication information is kept in the memory, so that the device can renew the access to the service by the station without requiring the station to re-enter a PIN code.

The device may set a station that has been set in the DISABLED state into the ALLOWED state. This is initiated by an action from a user on the user interface of the device. This still requires an authentication implying a challenge-response mechanism between the device and the station. Anyway, this does not require a user confirmation on the station, as is done for the authorization process. The user does not have to enter the PIN code again on the station.

For enhanced security, when a station enters the NEW state, a timer starts. When the timer reaches a limit value, 'newlimit', then the station is automatically removed from the data base and considered as unknown. The 'newlimit' may be set for example to a one hour value.

The device can also directly set a paired station into the BANNED state. This is done by an action from the user on the user interface of the device.

The device may also delete a paired station from the data base. This is done by an action from the user on the user interface of the device. The station is then unknown.

The device may delete a station that has been in the BANNED state from the data base. This is done by an action from the user on the user interface of the device. This station is then an unknown station, and it is then allowed to authenticate again with the device.

The device may delete a station that has been in the PAIRING FAILED state from the data base. This is done by an action from the user on the user interface of the device. This station is then a station in the 'unknown' state, and it is then allowed to authenticate again with the device.

The device may comprise a display, or may be accessible with a HTTP GUI (Graphical User Interface) or Telnet CLI (Command Line Interface). This allows a user to consult and modify the data base; by changing the state of a station in the list or removing a station from the list. In particular the user may be allowed to carry out some or all of the following actions:
- move a station from the NEW state to DISABLED or ALLOWED states;
- move a station from the DISABLED sate to the ALLOWED state and vice-versa;
- set a paired device to the banned state;
- set a station, paired or banned, into an unknown state.

The invention claimed is:

1. A method of enabling access of a wireless station to a service owned by a wireless device, said wireless station communicating with said wireless device through a wireless network, wherein the wireless device keeps records of wireless stations that had previously been authenticated, the record comprising respective first or second status for those wireless stations, indicating enabled or disabled access to said service, respectively, the method, when adding a wireless station for which no record is kept, comprising, at the wireless device, the steps of:
   authenticating said added wireless station to said wireless device, the authentication including verification of the identity of said added wireless station at said wireless device, and if the verification succeeds and said added wireless station is authenticated, then further:
      adding a record for said added wireless station, and assigning a third, intermediary status to the wireless station that is neither enabling nor disabling access to said service, said added wireless station being able to be moved from said third intermediary status to said first or second status,
   enabling or disabling access of said added wireless station to said service from said third intermediary status, and
   updating the record and the status accordingly,
wherein the method further comprises, at the wireless device, the steps of:
   modifying, by a user, a previously assigned first or second status of a recorded wireless station, for which a record is kept, from enabled to disabled access in order to suspend access to said service, or from disabled to enabled access in order to renew access to said service, respectively, and
   updating the record and the status accordingly, wherein in the case of enabling access of a recorded wireless station, whose access had previously been disabled, verification of the identity of said recorded wireless station is not required for accessing said service.

2. The method of claim 1, wherein in case of disabled access, an attempt from said wireless station to access said at least one service is rejected.

3. The method of claim 1, wherein the step of modifying the status of said wireless station is performed by a user through a user interface on said wireless device.

4. The method of claim 1, wherein said wireless device and said wireless station communicate through a wireless personal area network.

5. The method of claim 4, wherein said wireless personal area network conforms to the Bluetooth standard.

6. The method of claim 1, further comprising:
   maintaining the record for the added wireless station for a predetermined time and, in case access of the added wireless station to the at least one service is not enabled or disabled within the predetermined time, deleting the record.

7. The method of claim 1, further comprising:
   assigning, at the wireless device, a fourth status to a wireless station, wherein the fourth status blocks the authentication of the wireless station, and wherein a wireless station having the fourth status cannot complete a further authentication with the wireless device.

8. A wireless device comprising wireless communication means for communicating to a wireless station, and a memory, wherein the wireless device owns a service to be wirelessly accessed from the wireless station, the wireless device comprising a state management module that is configured to keep records of wireless stations that had previously been authenticated, the record comprising a respective first or second status for those wireless stations, indicating enabled or disabled access to said service, respectively, wherein the state management module is further configured to, when adding a wireless station for which no record is kept:
   authenticate said added wireless station to said wireless device, the authentication including verification of the identity of said added wireless station at said wireless device, and if the verification succeeds and said added wireless station is authenticated, then further:
      add a record for said added wireless station, and assign a third, intermediary status to the wireless station that is neither enabling nor disabling access to said service, said added wireless station being able to be moved from said third intermediary status to said first or second status,
   enable or disable access of said added wireless station to said service from said third intermediary status, and
   update the record and the status accordingly,
wherein the state management module is further configured to:
   modify, as directed by a user, a previously assigned first or second status of a recorded wireless station, for which a record is kept, from enabled to disabled access in order to suspend access to said service, or from disabled to enabled access in order to renew access to said service, respectively, and
   update the record and the status accordingly, wherein in the case of enabling access of a recorded wireless station, whose access had previously been disabled, verification of the identity of said recorded wireless station is not required for accessing said service.

9. The wireless device of claim 8, wherein in case of disabled access, the state management module is configured to reject an attempt from said wireless station to access said service.

10. The wireless device of claim 8, wherein it comprises a user interface for allowing a user to access said memory and to administer the state of said wireless station.

11. The wireless device of claim 10, wherein said user interface comprises either a command line interface or a graphical user interface.

12. The wireless device of claim 10, wherein said user interface permits a user to manage the state of the wireless station in said memory.

13. The wireless device of claim 8, wherein said wireless communication means enable to connect to a wireless personal area network.

14. The wireless device of claim 13, wherein said wireless personal area network conforms to the Bluetooth standard.

15. The wireless device of claim 8, wherein the state management module is configured to maintain the record for the added wireless station for a predetermined time and, in case access of the added wireless station to the at least one service is not enabled or disabled within the predetermined time, deleting the record.

16. The wireless device of claim 8, wherein the state management module is configured to assign a fourth status to a wireless station, wherein the fourth status blocks the authentication of the wireless station, and wherein a wireless station having the fourth status cannot complete a further authentication with the wireless device.

\* \* \* \* \*